UNITED STATES PATENT OFFICE.

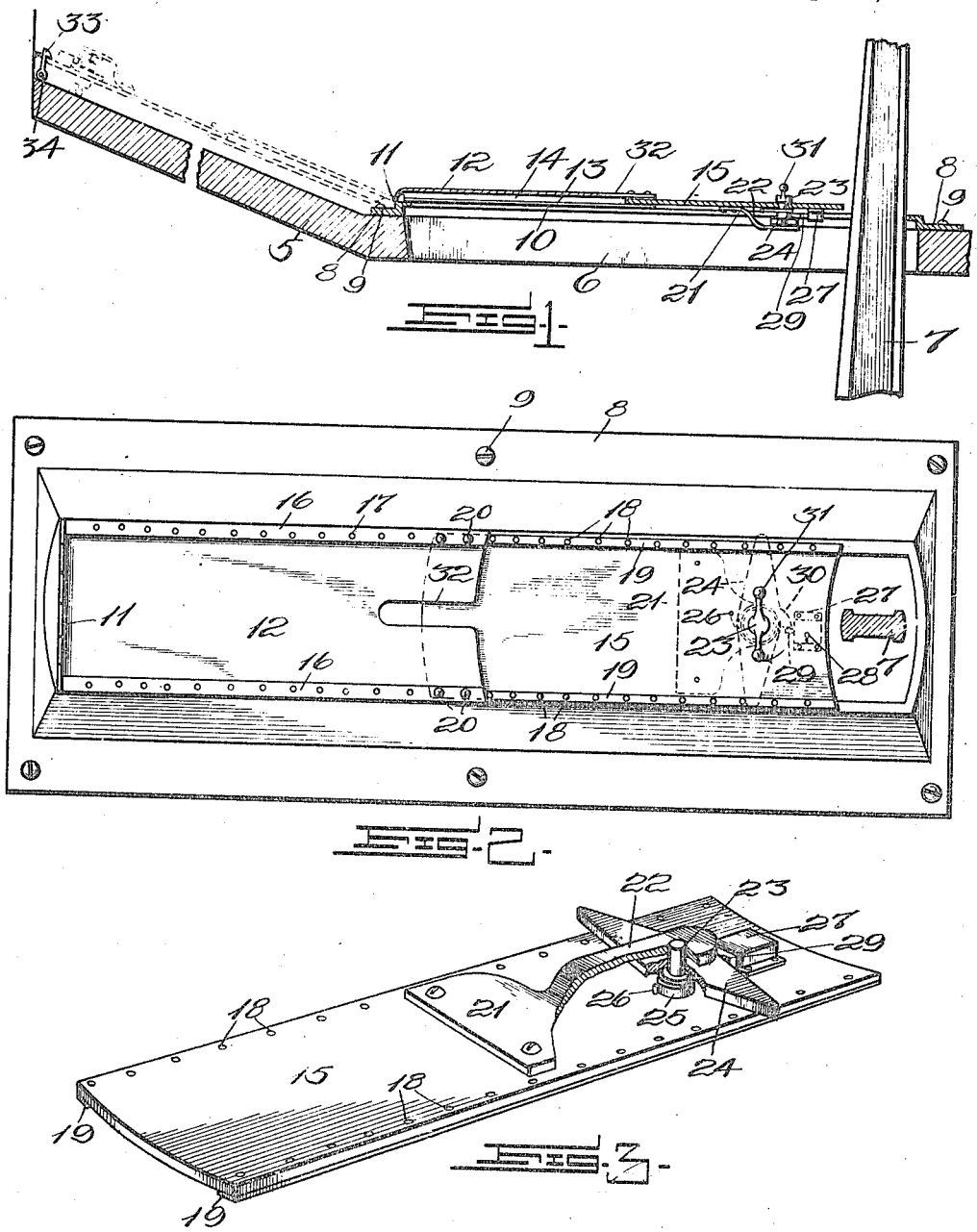

THOMAS L. PARK, OF SAN DIEGO, CALIFORNIA.

LOCK FOR AUTOMOBILES.

1,136,358.  Specification of Letters Patent.  Patented Apr. 20, 1915.

Application filed July 15, 1914. Serial No. 851,107.

*To all whom it may concern:*

Be it known that I, THOMAS L. PARK, a citizen of the United States of America, residing at San Diego, in the county of San Diego and State of California, have invented certain new and useful Improvements in Locks for Automobiles, of which the following is a specification.

This invention relates to locks for automobiles, and it has for its object the provision of a device of this nature adapted to lock the gear controlling lever of an automobile in such position as to hold the emergency brake applied, or to hold the gears in neutral position.

As is well known, the gear controlling lever in some cars is so arranged that when it is drawn all the way back, the clutch is held neutral and the emergency brake is applied. As the lever is moved forward, the emergency brake is released, and after the lever is moved nearly to the front of the slot in which it travels, the clutch is permitted to engage the high speed.

As before stated, the object of the present invention is to hold the lever either in the first or the second named positions. It is apparent that when the lever is in this position and particularly when the lever is in the first named position, the car cannot be started.

Further objects and advantages of the invention will be set forth in the detailed description which now follows.

In the accompanying drawing, Figure 1 is a longitudinal sectional view showing the lock applied. Fig. 2 is a plan view of the lock, and Fig. 3 is an inverted perspective view of one of the sliding bolts constituting the lock.

Like numerals designate corresponding parts in all of the figures of the drawing.

Referring to the drawing, the numeral 5 designates the floor of an automobile, and 6 the slot through which the usual brake lever 7 operates. The emergency brake is applied when the lever is drawn to the right-hand end of the slot or to the position shown in Fig. 1. The parts so far described are of usual and well known construction.

In carrying out the invention, I provide a floor plate 8, secured in position by screws or bolts 9, and having a slot 10 formed therein which overlies slot 6. Hinged to this floor plate at 11, is a second plate 12 having flanges 13 along its edges which provide channels or guides 14, in which a plate 15 is slidably mounted. The edges of plate 12 are reinforced by strips 16 and openings 17 are formed through the plate and through the strips, which openings are adapted to register with like openings 18, formed through reinforcing strips 19 of plate 15, as well as through said plate 15.

Bolts, or like fastening devices 19, are adapted to traverse the openings 17 and 18 and to bind the plates together in any desired adjusted position. Plate 15 has secured upon its underside a plate 21, having an offset portion 22 in which the lower end of a stud 23 is journaled. This stud carries a button 24 which lies between plates 22 and 15. A spring 25, surrounding this stud, has one end secured to plate 15 at 26, and normally tends to move the button in the direction indicated by the arrow in Fig. 2. A key controlled lock 27 is mounted upon the underside of plate 15. The bolt 29 of lock 27 is adapted when projected, to lie in the path of movement of a lug 30, carried by button 24, to thereby hold the button in the dotted line position shown in Fig. 2, at which time the ends of the button are engaged beneath the side flanges of the floor plate 8 and hold the entire lock constituted by the plates 12 and 15 in the position shown in Figs. 1 and 2. In other words, at this time this lock prevents the emergency brake lever 7, from being moved forward in slot 6.

By the provision of the openings 17 and 18, plate 15 may be adjusted longitudinally with relation to plate 12, and to further render this possible, the upper portion of stud 23, which carries the operating handle 31, is adapted to enter a slot 32 formed in one end of plate 12. A spring latch 33, is pivoted at 34 and is adapted to engage the lock and hold the same in the dotted line position shown in Fig. 1 when the lock is not in use.

When it is desired to lock the lever 7 against movement, the lock is swung over to the full line position shown in Fig. 1. At this time the spring 25 has actuated button 24 to swing it in the direction indicated by the arrow, and to move its ends to such position that they will clear the side flanges of the floor plate as the lock is swung to said full line position.

After the lock has been swung to this position, the operator grasps handle 31, and turns said handle in a direction reverse to that indicated by the arrow to bring the button to the dotted line position in Fig. 2, after which, by means of a key inserted in key hole 28, bolt 29 may be projected to lie in the path of lug 30 in a manner that will be readily understood. When, by means of the key, this bolt is retracted, the spring 25, will immediately operate to move the button in the direction indicated by the arrow to release the lock.

While the elements shown and described are well adapted to serve the purpose for which they are intended, it is to be understood that the invention is not limited to the precise construction set forth, but includes within its purview, such changes as may be made within the scope of the appended claims, when said claims are given a broad construction.

Having described my invention what I claim is:

1. In a device of the character described the combination with a member having a slot and a lever operating therein, of a locking plate hinged at one end of said slot and adapted to swing down in front of and prevent movement of said lever, an oscillatory button carried by said plate and lying upon the under side thereof and controllable from the upper side thereof, said button being adapted when turned to a position transversely with relation to said plate, to engage beneath the side edges of said slot, a lock comprising a bolt and a member carried by said button and with which said bolt is adapted to engage to prevent movement of said button.

2. In a device of the character described the combination with an element having a slot formed therein and a lever operating in said slot, a floor plate likewise slotted and arranged upon said element with the slot of the floor plate overlying the slot of said element, a locking element comprising a pair of plates longitudinally adjustable with relation to each other, one of which is hinged at its end to said floor plate, an oscillatory stud passing through the other of said plates and provided upon its lower end with a button adapted to engage beneath the side edges of said floor plate, and a lock mounted upon the underside of the last named plate and arranged to engage said button to prevent movement thereof.

3. In a device of the character described, the combination with a member having a slot with a longitudinally extending hinged locking member at one end of said slot, a lever operating in said slot and arranged to be engaged by said locking member, a stud passing through the free end of said locking member, a button carried by said stud which lies upon the underside of said member, and a lock for holding said button in a position to engage beneath the side edges of said slot, substantially as shown and described.

4. In a device of the character described, the combination with a member having a slot and a lever operating therein, a locking member comprising a pair of longitudinally adjusted plates secured to each other, means for hinging one of said plates at one end of said slot, the other of said plates being movable into the path of said lever, a button mounted upon the under face of one of said plates, spring means for actuating said button in one direction and a lock for holding said button against action by said spring.

In testimony whereof I affix my signature in presence of two witnesses.

THOMAS L. PARK.

Witnesses:
J. C. HIZAR,
J. L. HIZAR.